United States Patent [19]

Meunier

[11] Patent Number: 5,687,149
[45] Date of Patent: Nov. 11, 1997

[54] DEVICE FOR RECORDING DATA IN A DISTURBED ENVIRONMENT

[75] Inventor: Hugues Meunier, Les Essarts le Roi, France

[73] Assignee: Dassault Electronique, Saint Cloud, France

[21] Appl. No.: 277,027

[22] Filed: Jul. 19, 1994

Related U.S. Application Data

[63] Continuation-in-part of Ser. No. 215,465, Mar. 21, 1994, abandoned.

[30] Foreign Application Priority Data

Jul. 19, 1993 [FR] France ................................. 93 08830

[51] Int. Cl.⁶ .......................................................... G11B 7/00
[52] U.S. Cl. .................... 369/54; 369/47; 369/44.14
[58] Field of Search ............................ 369/54, 58, 59, 369/60, 47, 48, 32, 124, 49, 44.32, 44.14; 360/69, 75

[56] References Cited

U.S. PATENT DOCUMENTS

| | | |
|---|---|---|
| 3,562,708 | 2/1971 | Verbarg et al. . |
| 3,848,262 | 11/1974 | Belcastro . |
| 4,320,450 | 3/1982 | Rose et al. . |
| 4,580,222 | 4/1986 | Fujii . |
| 4,636,905 | 1/1987 | Morimoto et al. ................ 360/137 |
| 4,858,220 | 8/1989 | Funada ............................. 369/116 |
| 4,862,298 | 8/1989 | Genheimer et al. ............... 360/60 |
| 5,067,106 | 11/1991 | Pedersen et al. . |
| 5,072,317 | 12/1991 | Fukushima et al. .............. 369/58 X |
| 5,265,077 | 11/1993 | Yoshimoto et al. .............. 369/32 |
| 5,303,218 | 4/1994 | Miyake ........................... 369/59 X |
| 5,333,138 | 7/1994 | Richards et al. .................. 371/7 |

OTHER PUBLICATIONS

IBM Technical Disclosure Bulletin vol. 30, No. 6, pp. 81-82, Nov. 1987, Armonk, New York, USA.
Patent Abstracts of Japan, vol. 6, No. 209 (P-150) (1087) Oct. 21, 1982 & JP-A-57 113 464 (Nippon Denki) 14 Julliet 1982.

*Primary Examiner*—Muhammad N. Edun
*Attorney, Agent, or Firm*—Pollock, Vande Sande & Priddy

[57] ABSTRACT

The data-recording device comprises: a temporary safety electronic-technology medium (MEM), on which the data (D) coming from the interface (IT) are recorded temporarily, in succession, as they are received. Particular means (AC, TH) acquire at least one selected quantity relating to a predetermined environmental or operating condition of the recording device or of at least one its constituent components and supply a datum (A0, T0) representative of the said quantity acquired. The control unit (UT) comprises a recording mode in which the quantity (A0, T0) acquired is compared with at least one predetermined value (A2, T2) and, when a quantity acquired is greater than the said predetermined value, access to the recording medium of magneto-optical technology (DIS) is not authorized, whereas, when a quantity acquired is less than or equal to the said predetermined value, the data stored temporarily on the temporary safety medium (MEM) are recorded on the recording medium (DIS), as long as access to the said recording medium is authorized.

19 Claims, 6 Drawing Sheets

DEVICE FOR RECORDING DATA IN A DISTURBED ENVIRONMENT

This application is a continuation-in-part of U.S. Ser. No. 08/215,465, filed on Mar. 21,1994, now abandoned.

FIELD OF THE INVENTION

The present invention relates to the technical field of data recording in a harsh environment.

BACKGROUND OF THE INVENTION

Currently, the use of magnetic, optical or magneto-optical disk technology is limited to an office environment.

Under harsher environmental conditions, particularly on board an aircraft, this technology is not satisfactory in so far as it leads, at the very least, to the recording of incorrect data.

SUMMARY OF THE INVENTION

The present invention provides a solution to this problem.

The object of the present invention is to provide a data-recording device which can correctly record data on a magnetic- and/or optical- and/or magneto-optical technology recording medium in a harsh environment, particularly on board an aircraft.

The invention relates to a data recording device, which comprises an interface for receiving data to be recorded; recording means connected to the interface for recording data, emanating from the interface, on a magnetic- and/or optical- and/or magneto-optical technology recording medium; and a control unit for controlling the recording of the data on the recording medium.

Further, according to the present invention, the recording device also comprises a temporary safety electronic-technology medium, wherein the data, coming from the interface, is recorded temporarily on the temporary safety medium, sequentially, as it is received; means for acquiring at least one selected quantity relating to a predetermined environmental or operating condition of the recording device or of at least one of its constituent components, and for supplying a datum representative of the acquired quantity; and the control unit which comprises a recording mode in which the acquired quantity is compared with at least one predetermined value.

When an acquired quantity is greater than the predetermined value, access to the recording medium is not authorized, whereas when an acquired quantity is less than or equal to the predetermined value, the data stored temporarily on the temporary safety medium is recorded on the recording medium, as long as access to the recording medium is authorized.

In practice, the acquired quantity relates to the acceleration to which the recording device as a whole or at least one of its constituent components is subjected. The acquisition means are constituted by an accelerometer disposed in a predetermined geometrical relationship with respect to the sensitive axes of the recording device, in particular, the recording means.

Additionally, or alternatively, the acquired quantity relates to the ambient temperature of the recording device or at least one of its constituent components. In particular, the recording means and the acquisition means form a thermometer disposed in a predetermined geometrical relationship with respect to the recording device, and in particular the recording means.

Alternatively, the datum representative of the acquired quantity results from the data received at the interface level.

Moreover, alternatively, or additionally, the acquired quantity relates to the power supply of the recording device. The acquisition means are constituted by means for detecting a power interference, and power-supply means are also provided for supplying power to the temporary safety medium.

According to the present invention, the recording device is intended to be mounted in an aircraft.

The recording means are advantageously housed in a casing.

According to one embodiment of the present invention, the recording device also comprises a first U-shaped cradle, the base of which can receive the lower face of the casing, and the side walls of which are fixed removably to the side walls of the casing; a second U-shaped cradle, facing in the opposite direction, for covering the upper face of the casing; and resilient fixing means disposed between the side walls of the first cradle and those of the second cradle for fixing the first cradle resiliently to the second cradle.

The resilient fixing means preferably comprise a plurality of fixing elements, each comprising a screw having a head and a shank, wherein the shank has a threaded end which is intended to be screwed into a side wall of the first cradle, a first washer fitted onto the shank as far as a shoulder which is formed at a predetermined height on the shank, an element which forms a buffer fitted on the shank between the first washer and the side wall of the first cradle, a pot-shaped body having the flanges fixed to a side wall of the second cradle. The head of the screw, as well as a portion of the shank, are housed in the body in a manner such as to float between first and second fixed points which are spaced at a predetermined distance apart, with the shank extending through an opening formed in the base of the pot, a second washer fitted on the portion of the shank between the first and second fixed points, and at least first and second diaphragms, each made of a material having resilient-return characteristics suitable for damping the vibrations to which the recording means may be subjected, up to a predetermined level. The first and second diaphragms are housed in the body on either side of the second washer and bear on the faces of the second washer, respectively, to damp the mechanical vibrations of the shank between the first and second fixed points.

The recording device advantageously also comprises protection means which include storage means for temporarily storing a supply voltage and for delivering the supply voltage when there is a power interruption of a predetermined duration.

The file-description table of the data to be recorded and the root table are preferably safeguarded in the temporary safety medium before each recording of data on the recording medium.

The control unit is preferably arranged to control the recording of the data on the recording medium emanating from the temporary safety medium at the end of the file containing all the data previously recorded in the file.

Very advantageously, the control unit is arranged to close the file thus completed, as soon as the data block has been stored on the recording medium, and update the file and root allocation tables.

The size of the data blocks to be recorded on the recording medium and emanating from the temporary safety medium is selected in an appropriate manner.

According to a further aspect of the present invention, the recording device also comprises operating means which can act on the acquired quantity. If the acquired quantity is greater than the predetermined value, the control unit delivers a control signal to the operating means in order to return the acquired quantity to substantially below the predetermined value.

In practice, the operating means are active shock absorbers.

BRIEF DESCRIPTION OF THE FIGURES

Further characteristics and advantages of the invention will become clear in light of the following detailed description and the drawings, in which.

DETAILED DESCRIPTION OF THE INVENTION

Figure 1:
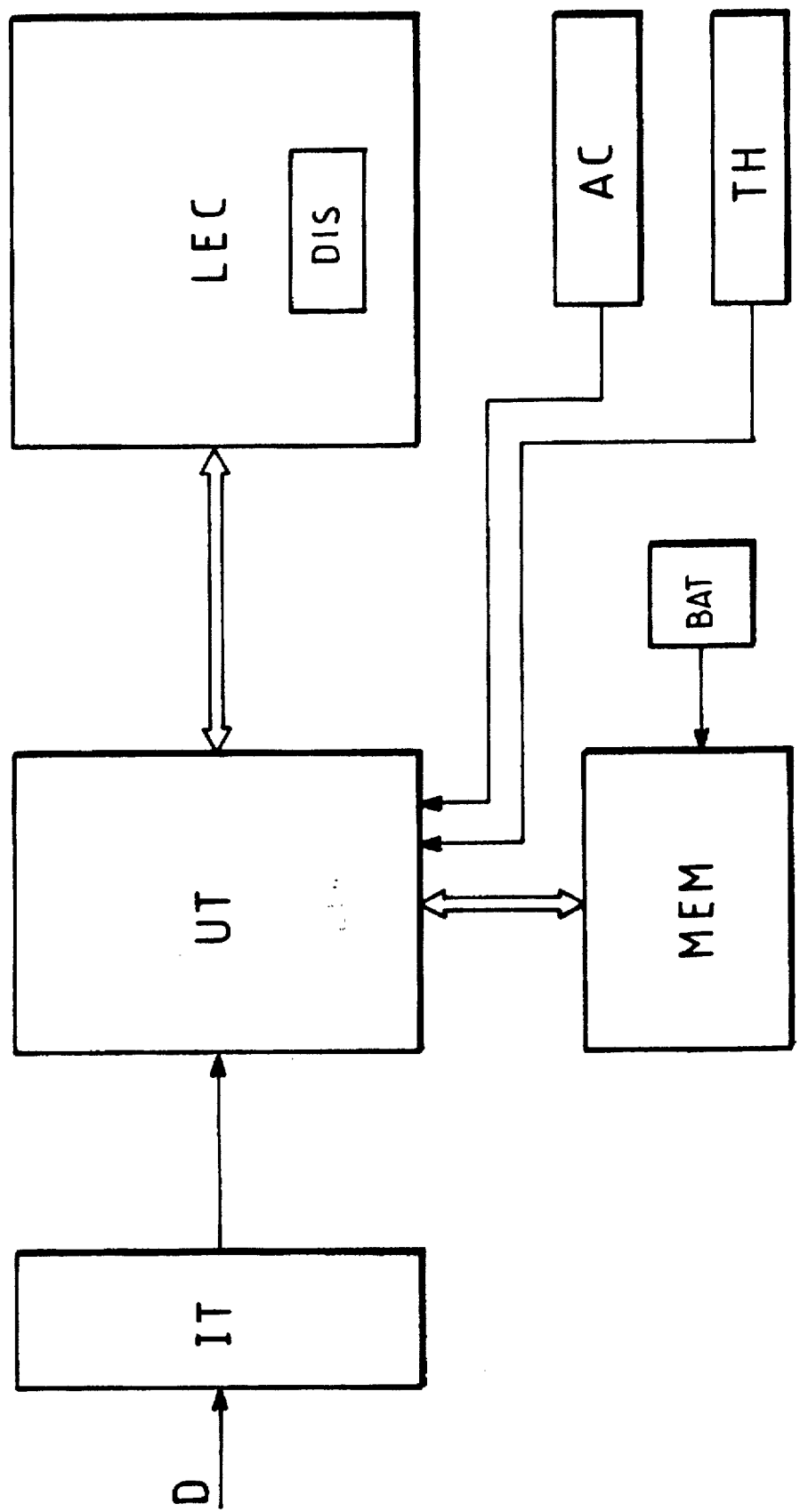
FIG. 1 is a schematic representation of the recording device according to the present invention.

In FIG. 1, the known means of the data-recording device comprise an interface IT for receiving data D to be recorded; recording means LEC connected to the interface IT, for recording data D emanating from the interface IT on a magnetic- and/or optical-and/or magneto-optical recording medium DIS; and a control unit UT for controlling the recording of the data D on the recording medium DIS.

As mentioned above, under harsh environmental conditions, particularly on board an aircraft, the technology of recording media, such as magnetic, magneto-optical or optical disks is not satisfactory, as it most often leads to the incorrect recording of data.

In order to solve this problem, the recording device according to the invention also comprises a temporary safety electronic-technology medium MEM. The data D coming from the interface IT is recorded temporarily on the temporary safety medium MEM, sequentially, as it is received. The invention further includes means AC and/or TH for acquiring at least one selected quantity relating to a predetermined environmental or operating condition for the recording device or for at least one of its constituent components, and for supplying a datum representative of the acquired quantity at a given moment.

For example, the quantity relates to the acceleration of the recording device as a whole or at least one of its constituent components. The acquisition means AC are constituted by an accelerometer disposed in a predetermined geometrical relationship with respect to the axes of the recording device, in particular of the recording means LEC which are sensitive to accelerations.

Alternatively, the datum representative of the acquired quantity results from data received at the interface level.

Additionally or alternatively, the quantity relates to the ambient temperature of the recording device or at least one of its constituent components. The acquisition means TH are constituted by a thermometer disposed in a predetermined geometrical relationship with respect to the recording device, in particular the recording means LEC.

Moreover, power-supply means BAT are provided for supplying power to the temporary safety medium MEM.

Figure 2:
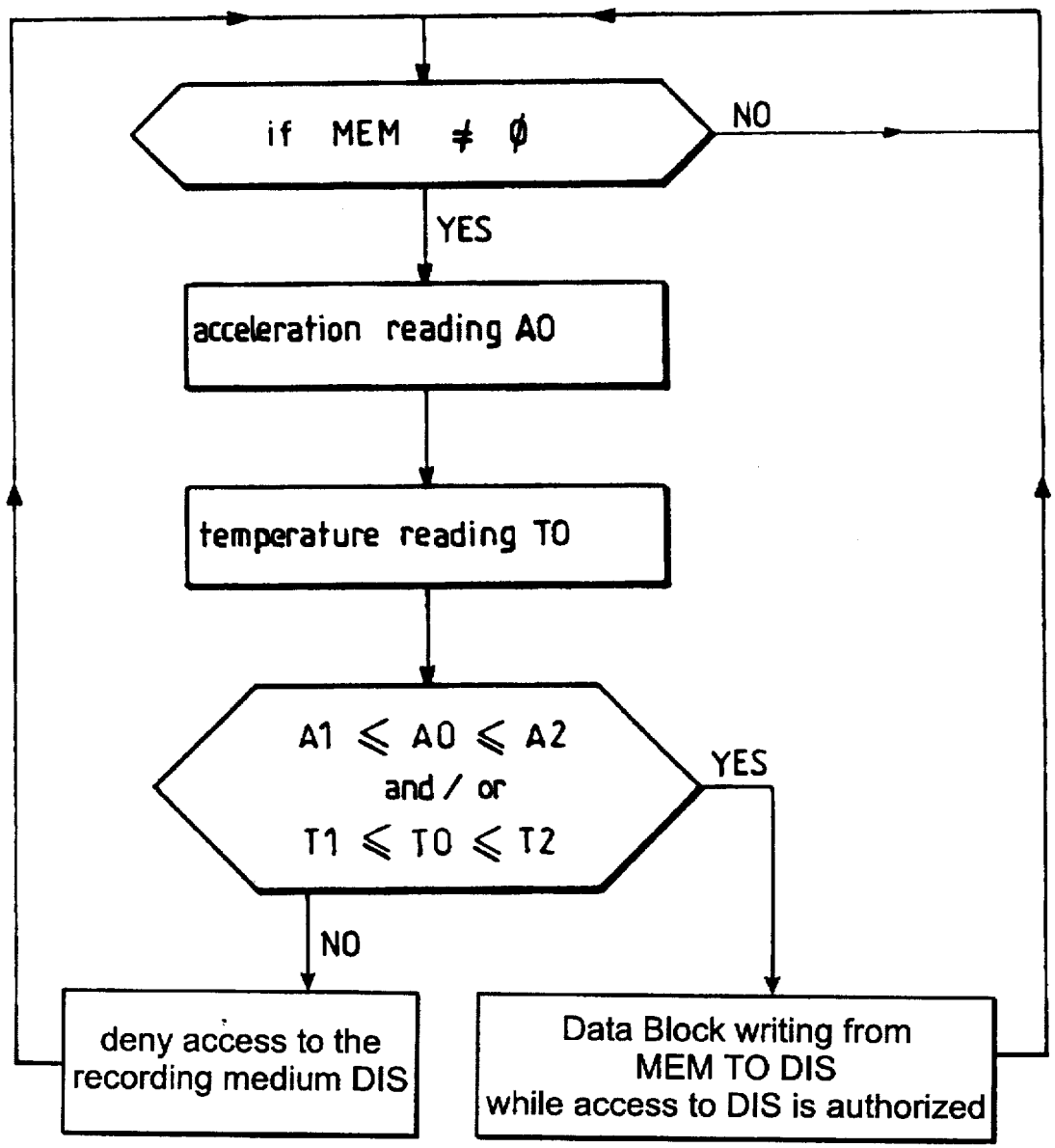
FIG. 2 is a flow chart showing the recording of data according to the present invention.

With reference to FIG. 2, the control unit comprises an operating mode which includes the following steps:

In step 1, if the temporary safety memory MEM is not empty, the acquired quantity AO, supplied at a given moment by the means constituted by an accelerometer, is read.

In step 2, if necessary, the acquired quantity TO, supplied at a given moment by the means constituted by a thermometer, is read.

In step 3, the acquired values AO and TO are compared with predetermined values A2 and/or T2.

Alternatively, it is checked whether the values AO or TO fall within the ranges A1–A2 and/or T1–T2.

In step 4, if the acquired quantity is greater than the predetermined value A2 and/or T2, or does not fall within the ranges A1–A2 and/or T1–T2, access to the recording medium DIS is not authorized.

In step 5, if a quantity A0 and/or T0 is less than or equal to the predetermined value A2 and/or T2, or falls within the ranges A1–A2 and/or T1–T2, the data stored temporarily on the temporary safety medium MEM is recorded, for example, in blocks of data of 8 kilobytes with eight bits per byte on the recording medium DIS, as long as access to the recording medium DIS is authorized.

The temporary safety medium MEM is a semiconductor memory of the RAM, EEPROM or flash type.

The capacity of the memory MEM is selected to permit the storage of all of the data to be stored during the longest period in which the recording medium DIS may be outside its operating range.

For example, the capacity of the memory is in the order of 1.5 megabytes with eight bits per byte.

Moreover, the recording medium DIS is, for example, a magneto-optical-technology medium such as that sold by the IBM company under the reference MD3125B.

According to the present invention, magneto-optical disk technology, which at the moment is only compatible with an office environment, advantageously becomes compatible with harsher environmental conditions, for example, in an aircraft.

For example, in order to permit correct recording of data on the magneto-optical-technology recording medium DIS, in spite of the linear accelerations to which the recording medium DIS is subjected being greater than it can accept, the recording device comprises at least one accelerometer AC and one temporary safety medium MEM, associated with a control unit UT having an operating mode described with reference to FIG. 2.

More precisely, as soon as the recording device is subjected to accelerations outside its operating range, no access is effected to the recording device.

When the environmental conditions become normal again, that is, when the accelerations are smaller, and the recording device, in particular the recording means operates, within its operating range, the data stored temporarily in the semiconductor memory MEM is recorded on the recording medium DIS.

Moreover, any new data received by the recording device for recording is also stored in the electronic memory MEM.

Naturally, this mode of operation on the basis of measurements and comparisons can be applied to any quantities relating to the environmental or operating conditions of the recording device or at least one of its constituent components, for example, acceleration, temperature, etc.

Another problem may also occur, for example, on board an aircraft. There may be temporary power interruptions of a duration greater than those which are covered by the internal supply module of the aircraft device.

The present invention also provides a solution to this problem.

More precisely, the recording device comprises circuits (not shown) for detecting variations in the power supply indicating interruptions and returns of the power supply of the internal supply module of the device (not shown).

In association with these detection circuits, a temporary safety medium MEM is used as described above, for example, with semiconductors being supplied by cells or by the batteries BAT. A logic algorithm which enables the data to be recorded according to the method of the present invention has the following steps.

First of all, any datum emanating from the interface IT for recording on the recording medium DIS is stored temporarily in the temporary safety medium MEM before being recorded on the recording medium.

As soon as a power interruption is detected by the detection circuits, all of the data which has not yet been recorded on the recording medium DIS remains stored in the temporary safety medium MEM.

A copy of the file-description table FAT, "File Allocation Table", which describes the sectors allocated for each of the files, and of the root table "ROOT" which describes the general parameters such as name, number of first sector, length, etc. of each of the files or sub-directories is also advantageously retained in the temporary safety medium MEM. This also enables these tables to be restored correctly when the supply resumes.

When the supply returns, the recording on the recording medium DIS of the data retained in the temporary safety medium MEM is resumed.

Any new data received by the recording device for recording is also stored on the temporary safety medium MEM.

Advantageously, in order to ensure the integrity of the data recorded by the equipment during power interruptions, physical protection is also provided by energy reserves, enabling interruptions of less than 100 milliseconds, for example, to be filtered.

The physical protection is advantageously achieved with the aid of storage capacitors (not shown).

This physical protection is provided in addition to the software protection described above and the safeguarding of the file-description table and of the root table in the memory MEM.

Figure 3:
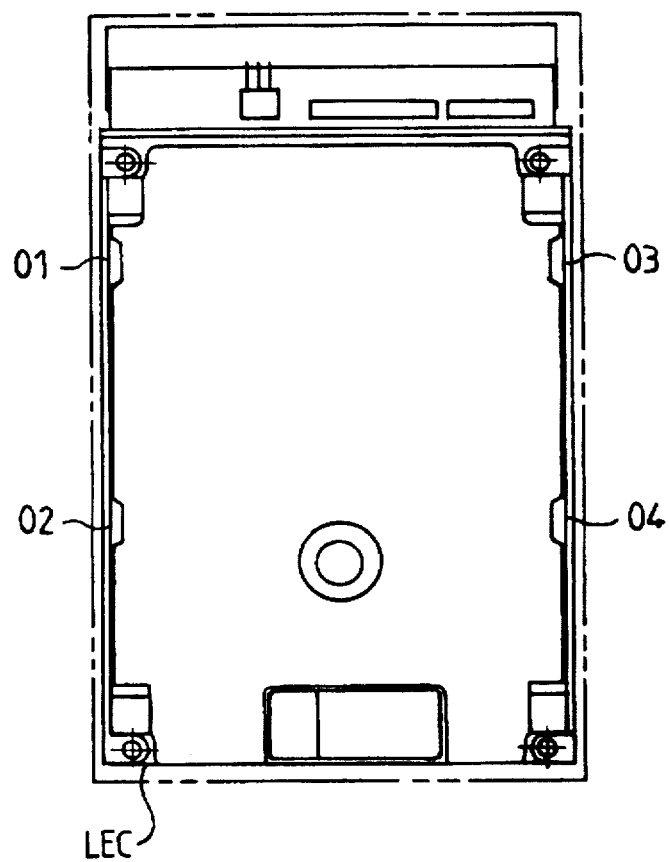
FIGS. 3 and 4 show schematically the fixing of the recording medium to the first cradle according to the present invention.
Figure 4:
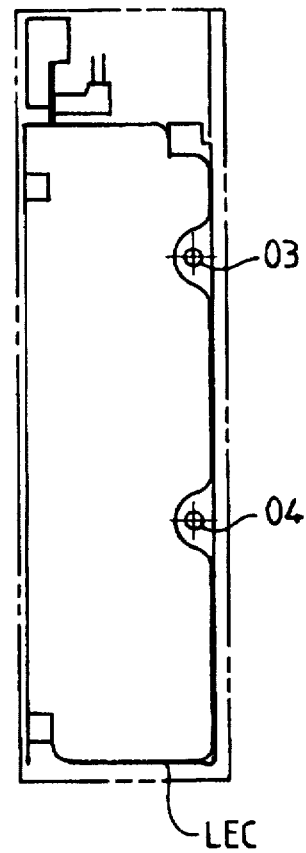
Figure 5:
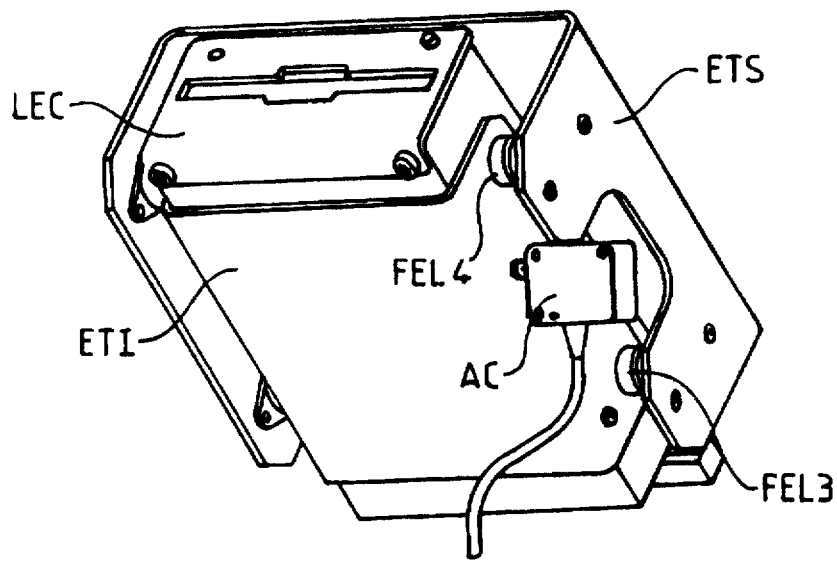
FIGS. 5 to 8 are views of the mechanical structure of the recording device according to the present invention.
Figure 6:
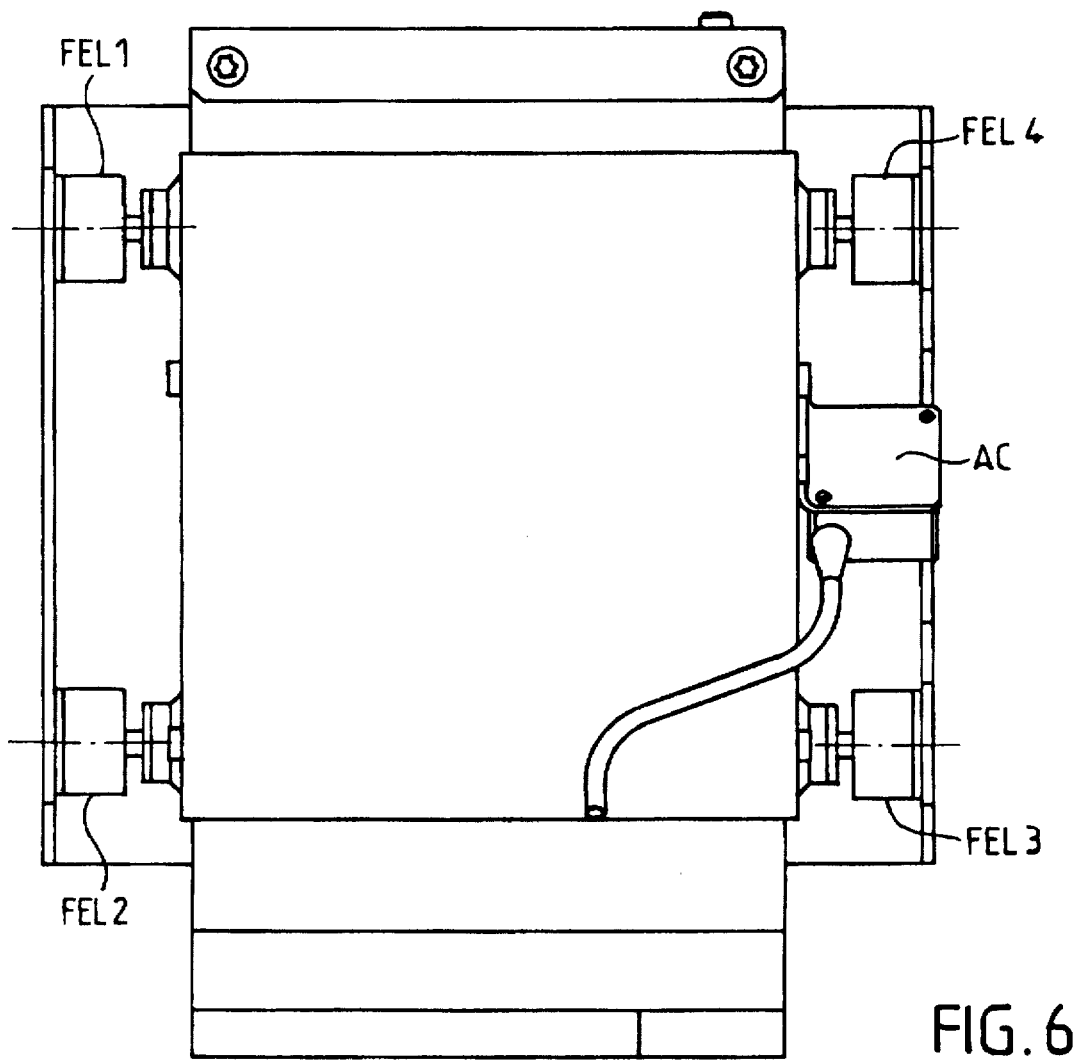
Figure 7:
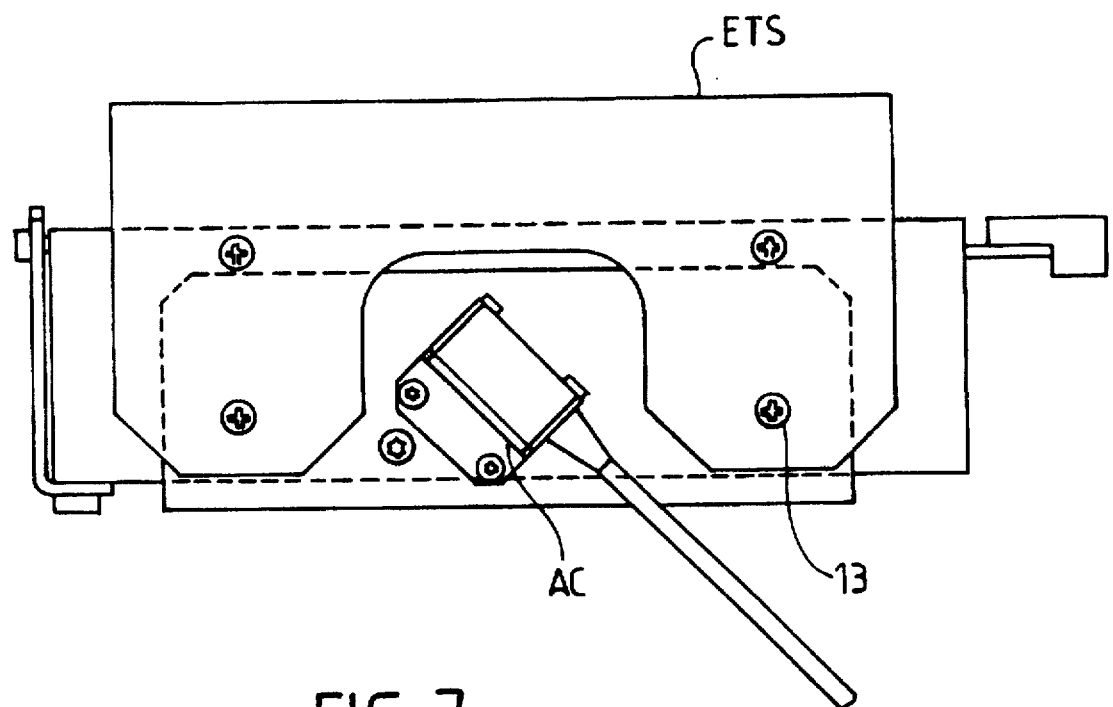

The fixing of the recording means in a device mounted in an aircraft is described with reference to FIGS. 3 and 4.

According to one aspect of the invention, the recording means, such as the magneto-optical reader MD3125B, are housed in a generally parallelepipedal casing.

It is fixed with the aid of four lateral fixing holes 01–04 formed in the side walls of the casing.

The first U-shaped cradle ET1 receives the lower portion of the casing. The side walls of the first cradle ET1 are removably fixed to the side walls of the casing through the fixing holes 01–04.

The basic rigidity of this framework is not sufficient, however, and introduces parasitic resonances.

The present invention provides a solution to this problem with the aid of a device comprising the following means (FIGS. 5 to 8):

a second U-shaped cradle ETS for covering the upper portion of the casing;

fixing means FEL1–FEL4 disposed between the side walls of the first cradle ET1 and those of the second cradle ETS, for resiliently fixing the first cradle ET1 to the second cradle ETS.

Figure 8:
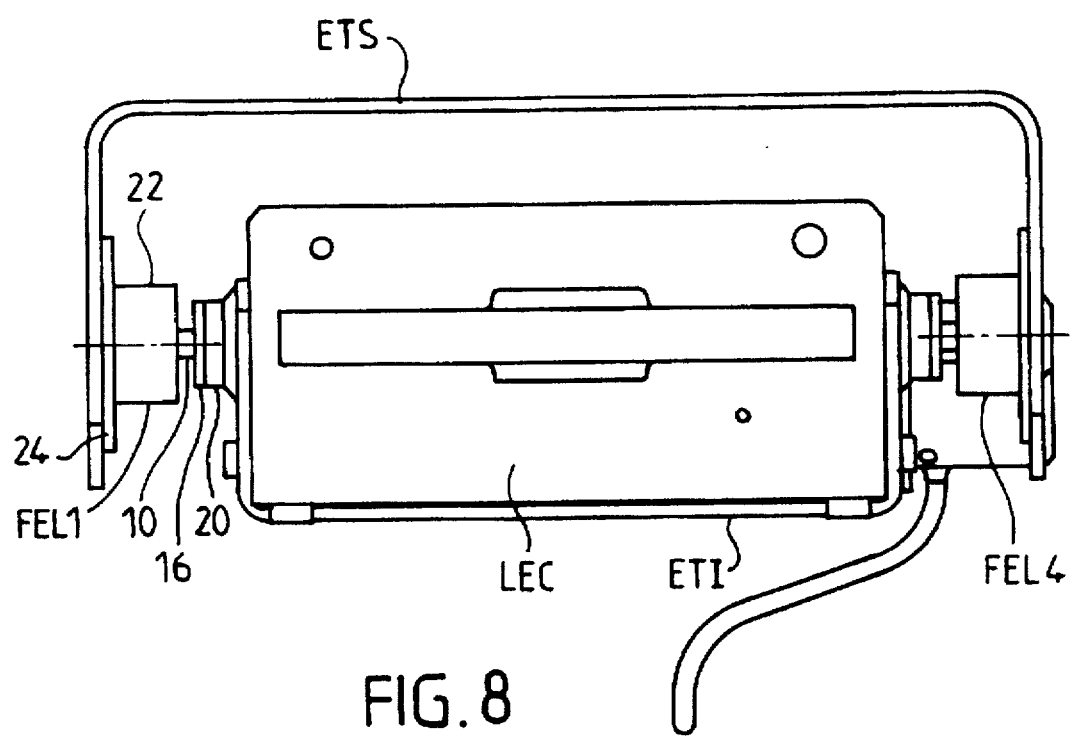
Figure 9:
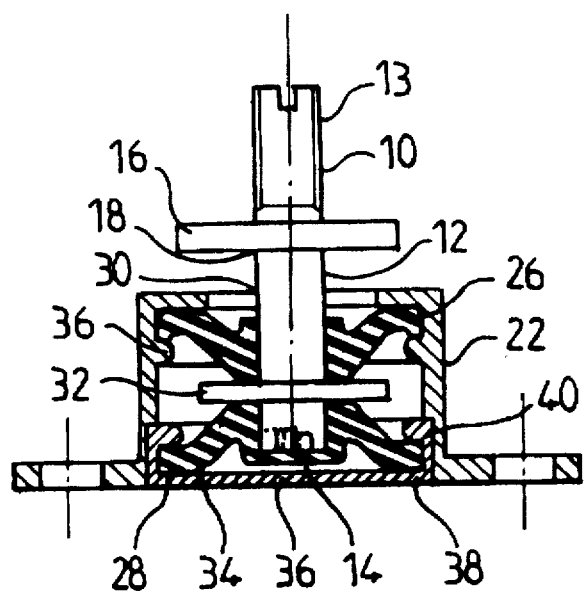
FIGS. 9 and 10 schematically show resilient fixing means according to the present invention.
Figure 10:
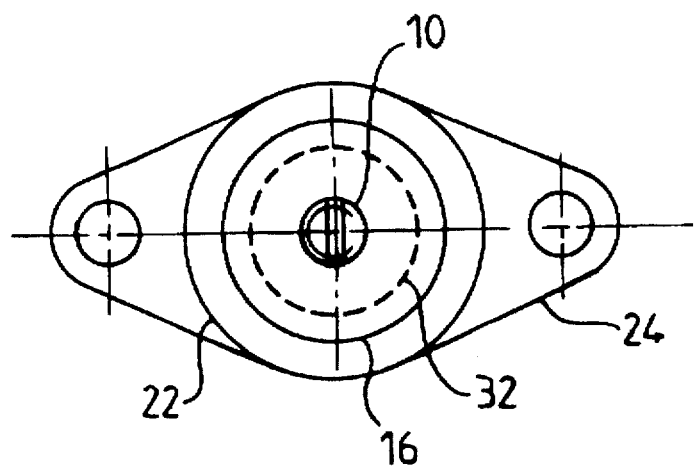

The resilient fixing means are now described with reference to FIGS. 8, 9 and 10.

Each element FEL1–FEL4 of the resilient fixing means comprises:

1) a screw 10 including a head 14 and a shank 12 having a threaded end 13 which is screwed into a side wall of the first cradle ET1;

2) a first washer 16 fitted onto the shank 12 as far as a shoulder 18 formed at a predetermined height on the shank 12;

3) an element 20, which forms a buffer, fitted on the shank 12 between the first washer 16 and the side wall of the first cradle ET1;

4) a pot-shaped body 22 having the flanges 24 fixed to a side wall of the second cradle ETS. The head 14 of the screw 10, as well as a portion of the shank 12, are housed in the body 22 to float between two fixed points 26, 28 which are spaced at a predetermined distance apart. The shank 12 extends through an opening 30 formed in the base of the pot-shaped body 22;

5) a second washer 32 fitted on the portion of the shank 12 between the two fixed points 26 and 28, and 6) at least first and second diaphragms 34 and 36, each made of a material having resilient-return characteristics suitable for damping vibrations of a given level to which the recording medium DIS may be subjected. The first and second diaphragms 34 and 36 are housed in the pot-shaped body 22 on either side of the second washer 32 and bear on the faces of the second washer 32, respectively, in a manner such as to damp the mechanical vibrations of the shank 12 between the two fixed points 26 and 28.

For example, each resilient fixing element is sold under the reference 567-GS-01 by GAMMA (a French company).

Moreover, the pot-shaped body 22 is closed by a cover 38 which is glued to the internal rims 40 of the pot-shaped body 22.

These fixing elements ensure the mechanical return of the casing and of the cradles ET1 and ETS towards the mechanical structure of the equipment.

FIGS. 5 to 8 show an accelerometer AC, for example, that sold by the company EURO SENSOR under the reference 3145-02. In this embodiment, it is fixed to the cradle ETS of the recording means LEC housed in the casing.

The accelerometer AC measures the residual accelerations along the sensitive axes of the recording means LEC.

According to one embodiment of the present invention, two accelerometers AC are provided and disposed in a predetermined geometrical relationship, for example, perpendicular to one another, in order to measure the accelerations of the recording device along two perpendicular axes.

Alternatively, the accelerations are measured by a single accelerometer AC disposed according to the accelerations.

In the presence of a single acceleration, the accelerometer AC is disposed on the axis of the acceleration, whereas in the presence of two perpendicular accelerations, the accelerometer AC is disposed at an angle of between 30° and 60° to the cradle ETS, for example.

The diaphragms 34 and 36 are made, for example, of a silicone-type material.

As far as temperature probes TH are concerned, there are two of these, being of the thermal resistance type. They are disposed near the recording means LEC.

According to one preferred embodiment of the invention, the recording of data on the recording medium DIS in magneto-optical technology emanating from the temporary memory MEM is performed at the end of the file containing all the data previously recorded in this file. The file is closed as soon as the block has been recorded, with the updating of the file description (FAT) and the root tables (ROOT).

The file completed in this manner forms a coherent whole.

The result thereof is that, at any moment, all the data recorded on the recording medium DIS can be used. In other words, the file is managed in "real time".

This is an important advantage in that this type of management permits extraction from or rereading of the recording medium DIS at any moment.

It also enables a plurality of files to be used for recording the data. This is particularly advantageous in the application of recording the data per flight, with the allocation of a given file to a given flight, for example.

The files recorded on the recording medium DIS are preferably in DOS (Disk Operating System) format.

The recording is effected block by block by means of a "WRITE APPEND" instruction for the block in the file and a "close" instruction for the file thus completed, with an update of the root table ROOT and the file description table FAT.

Moreover, the number of recordings on a given sector of the recording medium DIS can be limited, for example, to $10^6$ re-recordings.

The size of the data blocks to be recorded on the recording medium DIS must be dimensioned according to a formula which will be described below to enable the files described above to be managed in real time, without exceeding this limit.

The dimensioning of the data blocks TB in octets is a function of the following parameters (from the point of view of the table FAT):

$$NRFAT \cdot NRD \leq NRMAX$$

NRMAX being the maximum number of re-recordings of a given sector without risk of damaging this sector;

NRFAT being the maximum number of re-recordings of a given sector of the table FAT while the recording medium DIS is being filled;

NRD being the number of fillings of the recording medium DIS during the entire period of use;

where, in this case, for example:

$$NRD = 3600 \cdot HV \cdot DE \cdot \frac{din}{com \cdot VD \cdot 10^6}$$

HV being the number of operation hours per year,
DE being the duration of use in years,
din being the delivery rate of data to be recorded in octets per second,
VD being the capacity of the recording medium DIS in megaoctets, and com being the average occupation coefficient of the recording medium DIS in percent;

where, in this case, for example:

$$NRFAT = \frac{Ts \cdot NSc \cdot Ts}{Nac \cdot TB}$$

Ts being the size of a sector in octets,
NSc being the number of sectors per cluster,
Nac being the number of octets for describing the allocation of a sector or cluster in octets.

The size of the data block TB must be greater than or equal to:

$$TB \geq \frac{Ts \cdot NSc \cdot Ts \cdot 3600 \cdot HV \cdot DE \cdot din}{Nac \cdot com \cdot VD \cdot 10^6 \cdot NRMAX}$$

Moreover, the size TB is a function of the following parameters (from the point of view of the root table ROOT):

$$\frac{NESROOT}{NSUROOT} \leq NRMAX$$

NESROOT being the number of recordings on the same sector of the file ROOT, NSUROOT being the minimum number of sectors used in the file ROOT, where, in this case, NESROOT=3600·HV·DE·din/TB and NSUROOT=1+whole section of |NFMIN/NFROOT |

NFMIN being the minimum number of files on the recording medium, and
NFROOT being the number of files described by sector of the file ROOT, with $$NFMIN = \frac{com \cdot VD \cdot 10^6}{din \cdot TEMAX \cdot 3600}$$

and $$NFROOT = \frac{Ts}{NSF}$$

TEMAX being equal to the maximum time of use of the same file in hours and NSF being the number of octets for describing a file in the file ROOT in octets.

The size of the data block TB must be greater than or equal to:

$$TB \geq \frac{3600 \cdot HV \cdot DE \cdot din}{NRMAX \cdot 1 + pe \left| \frac{com \cdot VD \cdot 10^6 NSF}{din \cdot TEMAX \cdot 3600 \, Ts} \right|}$$

In order to minimize as far as possible the number of data not yet recorded on the recording medium when it is read or withdrawn, the recordings must be performed as frequently as possible. The size must therefore be as small as possible, while respecting the above conditions as much as possible. Nevertheless, it should be at least equal to the recording granule, i.e. a cluster.

The result thereof is that the size TB is advantageously taken as approximately equal to 8 kilooctets, with HV being on the order of 2000 hours per year, DE being in the order of one to ten years, din being in the order of 128 to 1024 octets per second, VD being in the order of 120 megaoctets, com being in the order of 0.7, TS being in the order of 512 octets, NSC being in the order of 4, Nac being in the order of 2, TEMAX being in the order of 8 to 12 hours and NSF being in the order of 32 octets.

The object of all the mechanisms described above is to use a recording medium not suitable for severe environmental conditions such as, for example, a commercially available magneto-optical disk, since the environmental conditions are very different from office use, for example, in an on-board type environment.

The mechanisms described above, in particular concerning the acceleration quantity, render improbable the generation of faulty sectors which may occur when a hardware error is generated during the recording of a sector when there is a mechanical disturbance.

According to a further embodiment of the invention, the device also comprises operating means which can alter the measured quantity. If the measured quantity is greater than the predetermined value, the control unit UT delivers a control signal to the operating means in order to return the measured quantity to substantially below the predetermined value.

In this case, the access to the recording medium DIS is still or again authorized, and the data can be recorded without the risk of poor recording when a mechanical disturbance occurs, for example.

The operating means are active shock absorbers enabling the limitation of a disturbance effects, for example. These shock absorbers dynamically reduce the vibrations to which the recording device or at least one of its constituent components is subjected. They are of the hydraulic or pneumatic type, for example.

I claim:

1. A device for recording data under harsh environmental or operating conditions, comprising:
    an interface for receiving the data to be recorded on a recording medium;
    a safety memory for temporarily storing the data prior to being recorded on the recording medium;
    means for acquiring at least one value representative of the environmental or operating conditions; and
    a control unit for receiving said at least one acquired value, wherein the control unit, prior to transferring the data from the safety memory to means for recording on the recording medium, compares said at least one acquired value with at least one predetermined threshold representative of critical environmental or critical operating conditions, and wherein the control unit denies access to the recording medium if said at least one acquired value differs from said at least one predetermined threshold.

2. A device according to claim 1, further comprising a temporary power supply for supplying power during a power interruption.

3. A device according to claim 1, wherein said at least one acquired value is an acceleration to which the device is subjected, and the acquisition means include an accelerometer disposed in a predetermined relationship with respect to an axis of the recording means.

4. A device according to claim 1, wherein said at least one acquired value is a temperature of the recording means, and the acquisition means include a thermometer.

5. A device according to claim 1, wherein said at least one acquired value results from the data received from the interface.

6. A device according to claim 1, wherein said at least one acquired value is power supplied to the device, and the acquisition means include means for detecting a power interruption.

7. A device according to claim 1, wherein the device is installed in an aircraft.

8. A device according to claim 1, wherein the recording means are housed in a substantially parallelepipedal case.

9. A device according to claim 8, further comprising:
    a first U-shaped cradle for receiving the lower face of the casing, having side walls removably fixed to the side walls of the casing;
    a second U-shaped cradle, facing in the opposite direction, for covering the upper face of the casing; and
    resilient fixing means disposed between the side walls of the first and second cradle for fixing the first cradle resiliently to the second cradle.

10. A device according to claim 8, wherein the resilient fixing means comprise a plurality of fixing elements, each element comprising:
    a screw having a head and a shank which comprises a threaded end for fastening to the side wall of the first cradle;
    a first washer fitted on the shank;
    means fitted on the shank for forming a buffer between the first washer and the side wall of the first cradle;
    a pot-shaped body having the flanges fixed to the side wall of the second cradle, wherein the head of the screw and a portion of the shank are housed in the pot-shaped body and float between a first and a second fixed point spaced at a predetermined distance apart, the shank extending through an opening formed in the pot-shaped body;
    a second washer fitted on the shank between the first and second fixed points; and
    at least first and second diaphragms made of a resilient material for damping mechanical vibrations of the shank between the first and second fixed points.

11. A device according to claim 1, further comprising storage means for storing a supply voltage and supplying the supply voltage when there is a power interruption of predetermined duration.

12. A device according to claim 1, wherein a file allocation table of the data to be recorded is stored in the safety memory before each recording of the data on the recording medium.

13. A device according to claim 1, wherein the data to be recorded on the recording medium is divided into a plurality of blocks, and the control unit sequentially transfers each data block from the safety memory to the recording means.

14. A device according to claim 13, wherein the data blocks form a file, and the control unit closes the file after recording of said each data block on the recording medium and updates a file allocation table of the data in the safety memory.

15. A device according to claim 1, wherein the data to be recorded on the recording medium is divided into a plurality of blocks, wherein the size of each block is selected such that the transfer is optimized.

16. A device according to claim 1, further comprising means for affecting said at least one acquired value, whereby the control unit provides a signal to activate said means if said at least one acquired value is not less than said at least one predetermined threshold in order to make said at least acquired value fall within said at least one predetermined threshold.

17. A device according to claim 16, wherein said means include shock absorbers.

18. A device according to claim 1, wherein said at least one predetermined threshold is a range of values between at least two values.

19. A device according to claim 1, wherein said at least one predetermined threshold is a single value.

* * * * *